United States Patent [19]

Akasaka

[11] 4,165,164
[45] Aug. 21, 1979

[54] DIAL CLICK STOP APPARATUS

[75] Inventor: Shigeo Akasaka, Kodaira, Japan

[73] Assignee: Nippon Kogaku K.K., Tokyo, Japan

[21] Appl. No.: 907,307

[22] Filed: May 18, 1978

[30] Foreign Application Priority Data

May 24, 1977 [JP] Japan .................. 52-66577[U]

[51] Int. Cl.² .................. G03B 17/00; G01D 13/00
[52] U.S. Cl. .................. 354/289; 116/213
[58] Field of Search .................. 354/288, 289, 150–155, 354/202; 116/129 T, 129 F, 124.2 R, 124.2 A, 114 J

[56] References Cited

U.S. PATENT DOCUMENTS 2,765,763 10/1956 Bretthauer .................. 116/114 J
2,789,528 4/1957 Kaden et al. .................. 116/114 J

FOREIGN PATENT DOCUMENTS 868108 2/1953 Fed. Rep. of Germany .......... 354/289

Primary Examiner—Donald A. Griffin
Attorney, Agent, or Firm—Fitzpatrick, Cella, Harper & Scinto

[57] ABSTRACT

A clicking apparatus for permitting two dials to be click stopped independently of each other comprises an intermediate member interposed between the two dials. The intermediate member has a through bore arranged in such manner that one open end of the bore may be opposed to any of a number of click holes or bores of the first dial and the other open end may be opposed to any of a number of click holes or bores of the second dial. In the through bore there are inserted two steel balls spaced by a biasing member by which one of the two steel balls is biased against the first dial and the other ball is biased against the second dial so as to effect click stop action for each dial.

4 Claims, 2 Drawing Figures

DIAL CLICK STOP APPARATUS

BACKGROUND OF THE INVENTION

1. Field of the Invention

The present invention relates to a dial click stop apparatus, and more particularly to such apparatus by which a plurality of dials may be conveniently accommodated.

2. Description of the Prior Art

In the conventional arrangement of such apparatus used for click stopping dials, for example, two dials rotatable about the same axis of rotation, there are provided two separate click stop devices, one for the first dial and the other or the second dial. Therefore, the click stop apparatus hitherto known and generally used for such purpose has the disadvantage that it requires a relatively large space and is complicated in structure.

SUMMARY OF THE INVENTION

Accordingly, I have conceived and contribute by the present invention a dial click stop apparatus that is compact and simple in structure and by which I am able to overcome the foregoing difficulties and disadvantages.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein:

FIG. 1 is a cross sectional view of an embodiment of the invention illustrating first and second dials; and FIG. 2 is a plan view of the first dial shown in FIG. 1, as viewed from the bottom thereof.

DETAILED DESCRIPTION OF PREFERRED EMBODIMENTS

Figure 1:
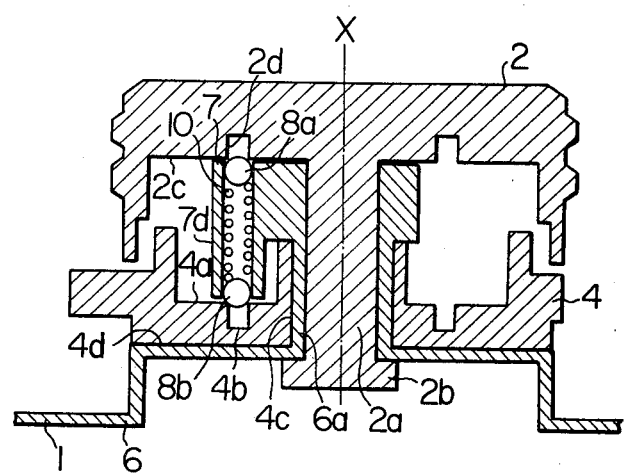

Referring to FIG. 1 showing an embodiment of the invention, the reference numeral 2 designates a first dial and 4 is a second dial each of which dials is interlocked with a contact or printed resistance board (not shown) in a known manner. Since the present apparatus may conveniently be used to provide various information settings in photographic cameras, the present description assumes by way of example that the apparatus is mounted on a camera body. Thus, the first dial 2 may be adapted for displaying camera shutter speed and the second dial 4 is for displaying film sensitivity in A.S.A. or Din, for example.

Figure 2:
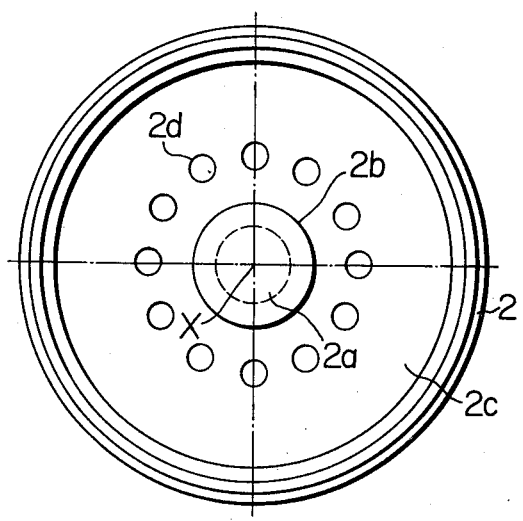

The first dial 2 has a shaft 2a the free end of which is formed with a flange 2b engageable with the camera body 6. The thrust movement of the dial 2 is limited by the camera body and an intermediate member 7 which may be threaded on the body or formed integral therewith, and the dial 2 is allowed only to rotate relative to the camera body 6 around the center longitudinal axis X of the shaft 2a. As clearly shown in FIG. 2, there are provided on the undersurface 2c of the first dial 2, as viewed, a first group of click bores or holes 2d regularly distributed on the circumference of a circle the center of which is on the center axis X. All the click holes 2d in the first group have the same diameter.

The second dial 4 has a center bore 4c through which the shaft 2a of the first dial 2 and a tubular portion 6a of the camera body 6 are passed. Like the first dial 2, the second dial 4 is allowed only to rotate about the center axis X of the shaft 2a relative to the camera body 6 and any thrust movement of the second dial is limited in one direction by the camera body and in the opposite direction by the intermediate member 7.

Also, on the upper surface of the second dial 4 there are provided a second group of click bores or holes 4b in a manner similar to that for the first group of the click holes 2d provided on the under surface of the first dial 2. The diameters of the click holes 4b in the second group are all the same. The center of a circle along which the second group of click holes 4b are distributed is also on the center axis X of the shaft 2a and the diameter of the circle is equal to that of the circle described by the first group of click holes 2d.

In this embodiment, the click holes 2d in the first group and the click holes 4b in the second group are aligned vertically as seen in FIG. 1. To communicate the former and the latter, there is provided in the intermediate member 7, a cylindrical through bore 7a passing through the member. The cylindrical bore 7a contains a first steel ball 8a and a second steel ball 8b serving as detent means and spaced by a compression spring 10 interposed therebetween. As clearly seen in FIG. 1, the first ball 8a is biased against the under surface 2c of the first dial 2 by the spring whereas the second one 8b is biased against the upper surface 4a of the second dial 4. Thus, the first steel ball 8a can be brought into engagement with a corresponding one of click holes 2d of the first dial and the second steel ball 8a into engagement with one of the click holes 4b of the second dial. To obtain the desired clicking effect, each of the steel balls is made to have a diameter larger than that of the corresponding click holes so that it may partially but not completely enter the holes.

With the above described arrangement of the apparatus, a click stop of the first dial 2 is effected by moving it by a sufficient angle of rotation around the axis X sufficient to bring the desired click hole 2a into engagement with the first steel ball 8a. The click stop of the first dial 2 can easily be cancelled, whenever desired, by rotating it further to overcome the force of the spring 10 thus disengaging the click hole from the ball.

In the same manner, a rotation of the second dial 4 about the axis X brings the desired hole 4b into engagement with the steel ball 8b to effect a click stop of the second dial. A further movement of the dial cancels the click stop as a result of disengagement of the hole 4b from the second steel ball 8b, also against the force of the spring 10.

While a plurality of click holes 2d and 4b are provided on the first and second dials, respectively, in this embodiment, the number of click holes may be varied in accordance with necessity.

Also, the diameter of the circle along which the first group of the click holes 2d are distributed may be different from that for the second group of click holes 4b.

But, when the diameters of these two circles each having its center on the axis X are entirely or approximately equal to each other as shown in this embodiment, the manufacture of apparatus becomes easy because the cylindrical bore 7a provided through the intermediate member 7 is parallel with the axis X.

As will be understood from the foregoing, according to the invention, a single compression spring is used for two purposes, that is, biasing the first steel ball against the surface of the first dial on one hand, and for biasing the second ball against the surface of second dial on the other hand so as to produce a clicking effect for both the dials. The compression spring is conveniently received in a bore provided in an intermediate member disposed between the first and second dials. Therefore, the apparatus according to the invention requires a reduced number of members and is compact and simple in structure.

While the invention has been particularly shown and described with reference to the preferred embodiment thereof, it will be understood by those skilled in the art that the foregoing and other changes in form and detail can be made therein without departing from the spirit and scope of the invention.

I believe that the construction and operation of my novel dial click stop apparatus will now be understood and that the advantages thereof will be fully appreciated by those persons skilled in the art.

I claim:

1. A dial click stop apparatus comprising:
    a first dial rotatably supported on a body and having on one surface thereof a plurality of bores distributed along a circle;
    a second dial rotatable about the same rotation axis as that of said first dial but independently of it and having on one surface thereof a plurality of bores distributed along a circle;
    an intermediate member interposed between said first and second dials and having a through bore passing through said member, one open end of said through bore being opposed to the locus of the circle along which the bores of said first dial are disposed and the other open end of said through bore being opposed to the locus of the circle along which the bores of said second dial are disposed, said intermediate member being fixed to said body;
    detent means in said through bore; and
    a biasing member also inserted in said through bore and adapted to bias one of said detent means against said first dial while biasing the other against second dial, whereby said first dial may be click stopped through engagement of one of said detent means with any one of the bores of said first dial and said second dial may be click stopped through engagement of the other of said detent means with any one of the bores of said second dial.

2. A dial click stop apparatus as claimed in claim 1, wherein said detent means are metal balls.

3. A dial click stop apparatus as claimed in claim 1, wherein said body is the body of a camera, said first dial is a shutter speed setting dial for introducing a shutter speed into an exposure meter built in said body of the camera and wherein said second dial is a film sensitivity setting for introducing a film sensitivity into said built-in exposure meter.

4. A dial click stop apparatus as claimed in claim 1, wherein said biasing member is a helical spring.

* * * * *

UNITED STATES PATENT AND TRADEMARK OFFICE
CERTIFICATE OF CORRECTION

PATENT NO. : 4,165,164
DATED : August 21, 1979
INVENTOR(S) : SHIGEO AKASAKA

It is certified that error appears in the above-identified patent and that said Letters Patent are hereby corrected as shown below:

Column 1, line 14, after "other" change "or" to --for--.

Column 2, line 41, change "8a" to --8b--.

Column 4, line 17, after "against" insert --said--.

Signed and Sealed this

Fifteenth Day of April 1980

[SEAL]

Attest:

SIDNEY A. DIAMOND

Attesting Officer

Commissioner of Patents and Trademarks